(12) United States Patent
Byers et al.

(10) Patent No.: US 6,650,451 B1
(45) Date of Patent: Nov. 18, 2003

(54) FREE SPACE OPTICAL BROADBAND ACCESS SYSTEM

(75) Inventors: Charles Calvin Byers, Aurora, IL (US); Stephen Joseph Hinterlong, Elburn, IL (US); Robert Allen Novotny, Naperville, IL (US); Robert E. Richardson, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/379,649

(22) Filed: Aug. 24, 1999

Related U.S. Application Data

(60) Provisional application No. 60/116,378, filed on Jan. 19, 1999.

(51) Int. Cl.[7] ............................................... H04B 10/00
(52) U.S. Cl. ...................................... 359/159; 359/172
(58) Field of Search .................................. 359/159, 172, 359/152, 118, 125

(56) References Cited

U.S. PATENT DOCUMENTS

| 5,777,768 A | 7/1998 | Korevaar ..................... 359/172 |
| 5,786,923 A | 7/1998 | Doucet et al. ............... 359/172 |
| 5,790,291 A | 8/1998 | Britz ........................... 359/159 |
| 5,999,299 A | * 12/1999 | Chan et al. .................. 359/172 |

FOREIGN PATENT DOCUMENTS

| GB | 2261575 | 5/1993 | ............ H04Q/7/04 |
| WO | 9749204 | 12/1997 | ........... H04B/10/00 |

* cited by examiner

*Primary Examiner*—John Tweel

(57) ABSTRACT

The scanning free space optical broadband access network uses LASERs to carry high-speed data streams between a central location and a number of subscribers served from that location. High-speed digital data modulates the LASERs in both directions, allowing a virtual MAN to be created. A few dozen subscribers share a single virtual pipe with several hundred Mbps band-width available. Beam scanning techniques at a central hub permit a single LASER and optical assembly to serve many customers.

33 Claims, 5 Drawing Sheets

FREE SPACE OPTICAL BROADBAND ACCESS SYSTEM

RELATED APPLICATIONS

Figure 1:
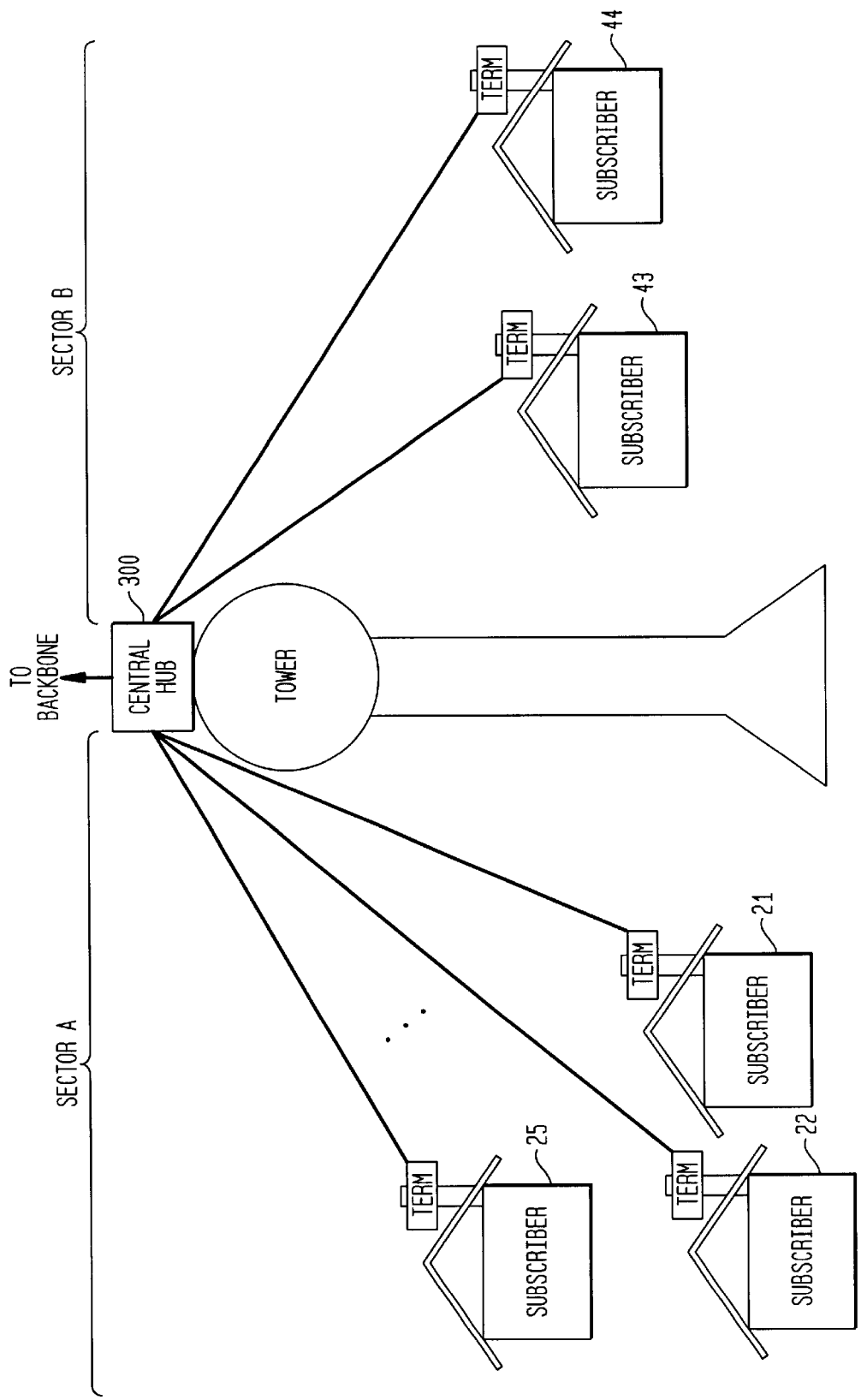

This Application claims the priority of Provisional Application No. 60/116,378, filed Jan. 19th, 1999, by the inventors of this Application.

TECHNICAL FIELD

This invention relates to broadband free space optical communications systems.

Problem

At this time, there exists a substantial, and rapidly growing demand for multi-megabit communications to homes or businesses. This high band width is required in support of computer access, web surfing, multi-media, voice, E-mail, and video applications. Unfortunately, the common broadband access network transport technologies of DSL (Digital Subscriber Lines including Asymmetric, Symmetric, and Rate Adaptive), cable modems, wireless broadband, satellite, and fiber to the subscriber, all suffer from problems limiting their deployment DSL re-uses the copper in the ground, and therefore, is fast and inexpensive to install, but it suffers from technology limitations related to loop characteristics, and is limited to a few Mbps. Regulatory and spectral allocation issues limit wireless broadband in networks, although they offer fast and inexpensive deployment. Fiber and satellite deployment have plenty of bandwidth, but are prohibitively expensive. The users are expecting the same quality, reliability and speed of access, currently enjoyed in large corporate Intranet installations, to be ubiquitously available everywhere.

Consequently, a point-to-point terrestrial microwave system is sometimes used. In this service, an antenna is mounted on a high tower, having line of sight access to a subscriber who requires the service. One such antenna is provided for each such subscriber. The antennas of the subscriber and the tower based antennas are aligned, so that each is aimed at the other. The system is expensive. One tower mounted antenna is required for each subscriber, and it is necessary to align that antenna with the subscriber's location when the system is installed. Further, the reliability of the system is limited to the reliability of each antenna, and its' associated electronics.

Another system that is used is LMDS, (Local Multi-Point Distribution System). In this system, a central omni-directional antenna serves a plurality of subscribers, each of which have a directional antenna aimed at the central antenna. The disadvantage of this arrangement is that all the subscribers must share a single slice of the radio spectrum; the radio spectrum must be individually licensed because the radio signal is broadly radiated.

Solution

The above problem is solved, and an advance is made over the teachings of the prior art in accordance with this invention, wherein an optical, line-of-sight transceiver (OLST), mounted on a suitably high platform is used to transmit a steerable modulated LASER beam to each of a plurality of customers within the sight of that OLST; when an OLST is steered to a particular customer, the OLST also receives signals from that customer to establish the other direction of communication, and to provide feedback as to whether the transmitted steered signal is being properly received. Advantageously, such an arrangement sharply reduces the number of OLSTs required to be mounted at tower sites, and eliminates the installation problem of manually aiming each tower mounted OLST that is required in a point-to-point distribution system. An OLST can serve customers in an angular region, called a sector of the tower. A few dozen to a few hundred subscribers share a single virtual pipe, (one sector of the tower), with several hundred Mbps bandwidth available to be shared by the customers of a sector.

In accordance with one preferred embodiment a group of several solid angle, (azimuth and elevation), sector OLSTs are mounted on a tower to serve the different sectors surrounding a tower. In Applicants' preferred embodiment, a group of eight such OLSTs serving eight different sectors is mounted as part of each hub. Advantageously, this limits the angle over which each OLST needs to be steered.

In accordance with Applicants' preferred embodiment, each customer is provided with a slice of time out of an overall repetition cycle. During this time slice, information is exchanged between the sector OLST and the customer using one wavelength downstream and a different, widely spaced wavelength upstream. In Applicants' preferred embodiment, the repetition cycle is typically 20 milliseconds. The slice of time allocated depends on how much data is to be transferred between the hub, and a particular customer. The amount of data which can be exchanged during each overall time cycle is limited by the demands of other customers being served during the same time cycle, and the electronic, mechanical and optical design of the system elements. Advantageously, the cycle limits the latency of information transmitted in the two directions to an amount that supports interactive services and voice transmission.

In accordance with Applicants' preferred embodiment, a pair of optical galvanometers, or other beam steering apparatus are used to control the angle of a transmitting and receiving mirror so that the LASERs are aimed at, and received from a single subscriber with which a particular OLST is currently communicating. Alternatively, other beam steering apparatus such as crystal-based beam deflectors can be used for steering the beam. Optical galvonometers are manufactured by, for example, General Scanning Corporation and Cambridge Scientific Corporation. Using this technology, the LASER beam and the receiving apparatus can be moved rapidly from one customer to another, thus, minimizing the overhead for moving the LASER beam. The scanning system moves the beam to the next customer when one of two events happen; either all of the data to be transmitted in each of the two directions has already been transmitted, or the allocated time slice for the customer has been used up. The size of the time slice is chosen to ensure that the beam visits each active subscriber at least once within the maximum interval needed to provide an acceptable latency, such as 20 milliseconds, to minimize the delay of critical services, such as voice. The data to drive the LASER, and the data received by the optical assembly, are sent/to, received/from a switching arrangement, for example, a router, and thence, to/from the broadband backbone network interconnecting the towers with each other, and with long distance facilities.

In accordance with Applicants' preferred embodiment, an overall control unit directs local control units within each OLST to determine which subscribers are to be controlled from which OLSTs. Advantageously, this permits subscribers in sector overlap areas, which can be served by either of two sectors, to be served by the less busy sector, thus increasing the overall capacity of the system.

Each subscriber's terminal consists of two fixed optical assemblies, both of which are carefully aligned with a central hub at installation, and permanently fixed. The first optical assembly is a LASER that is modulated by the upstream data in a burst, carefully timed to coincide with the downstream burst that results when the hub's scanner points at the subscriber. The other optical assembly is a lens and an optical receiver that terminates the downstream link. Data received from the downstream receiver and transmitted to the hub, passes over a standard local area network, and interconnects the subscriber terminal and the various pieces of equipment the user needs to connect to a backbone network for interconnecting hubs and other transmission and switching systems.

In the preferred embodiment, different wavelengths are used for the downstream and upstream signals; advantageously, this minimizes upstream/downstream crosstalk.

BRIEF DESCRIPTION OF THE DRAWING(S)

Figure 2A:
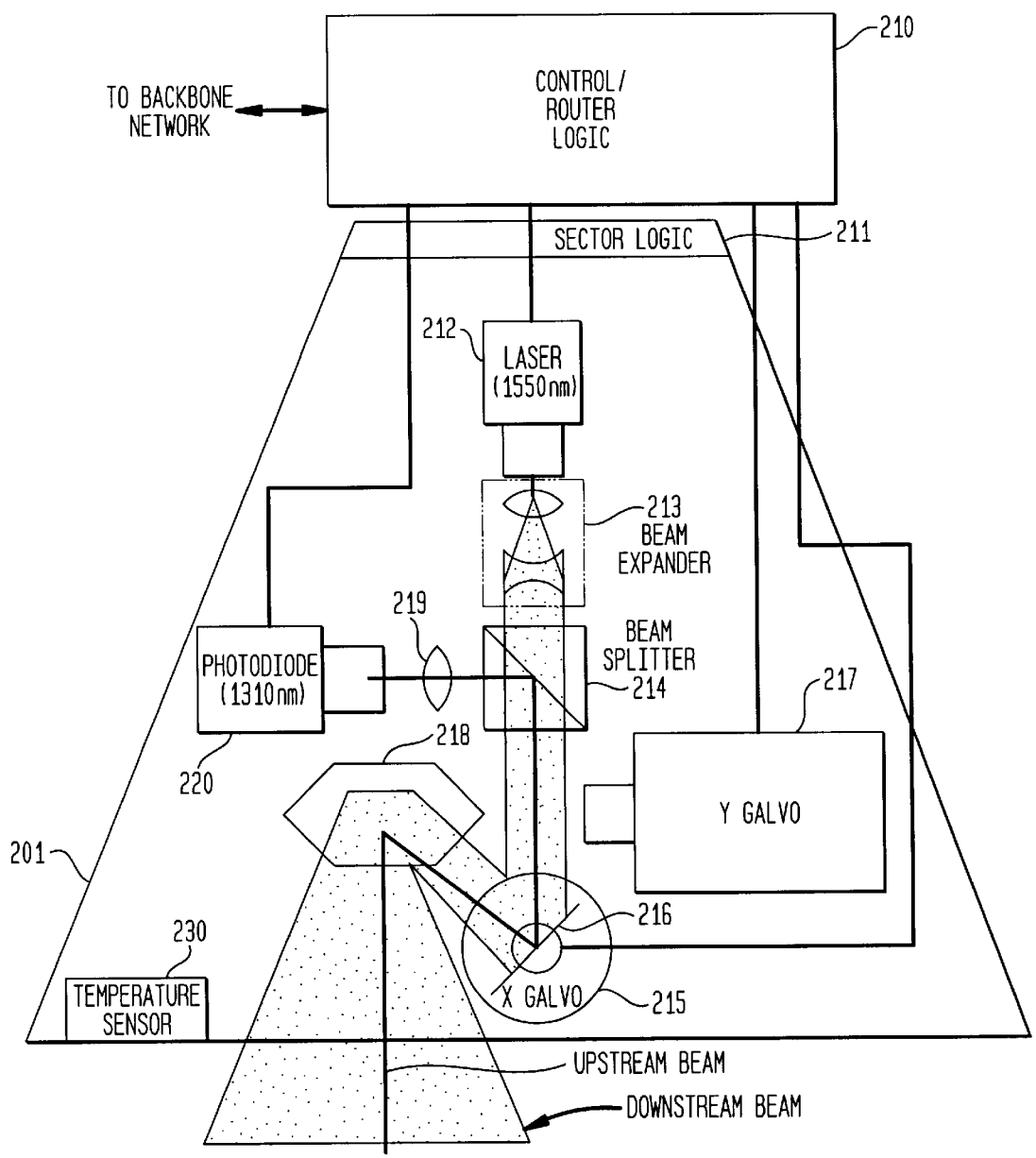
Figure 2B:
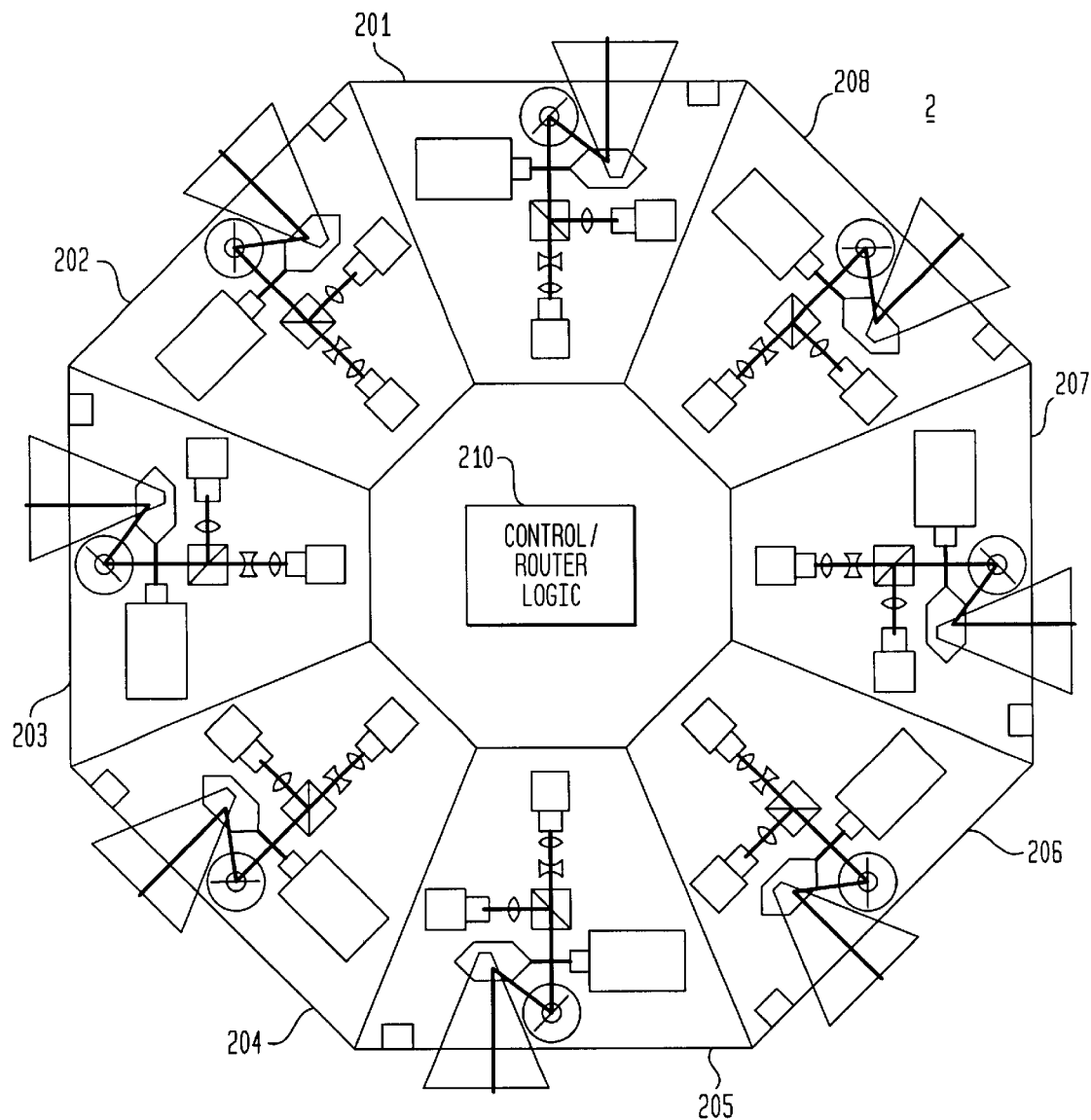
Figure 3:
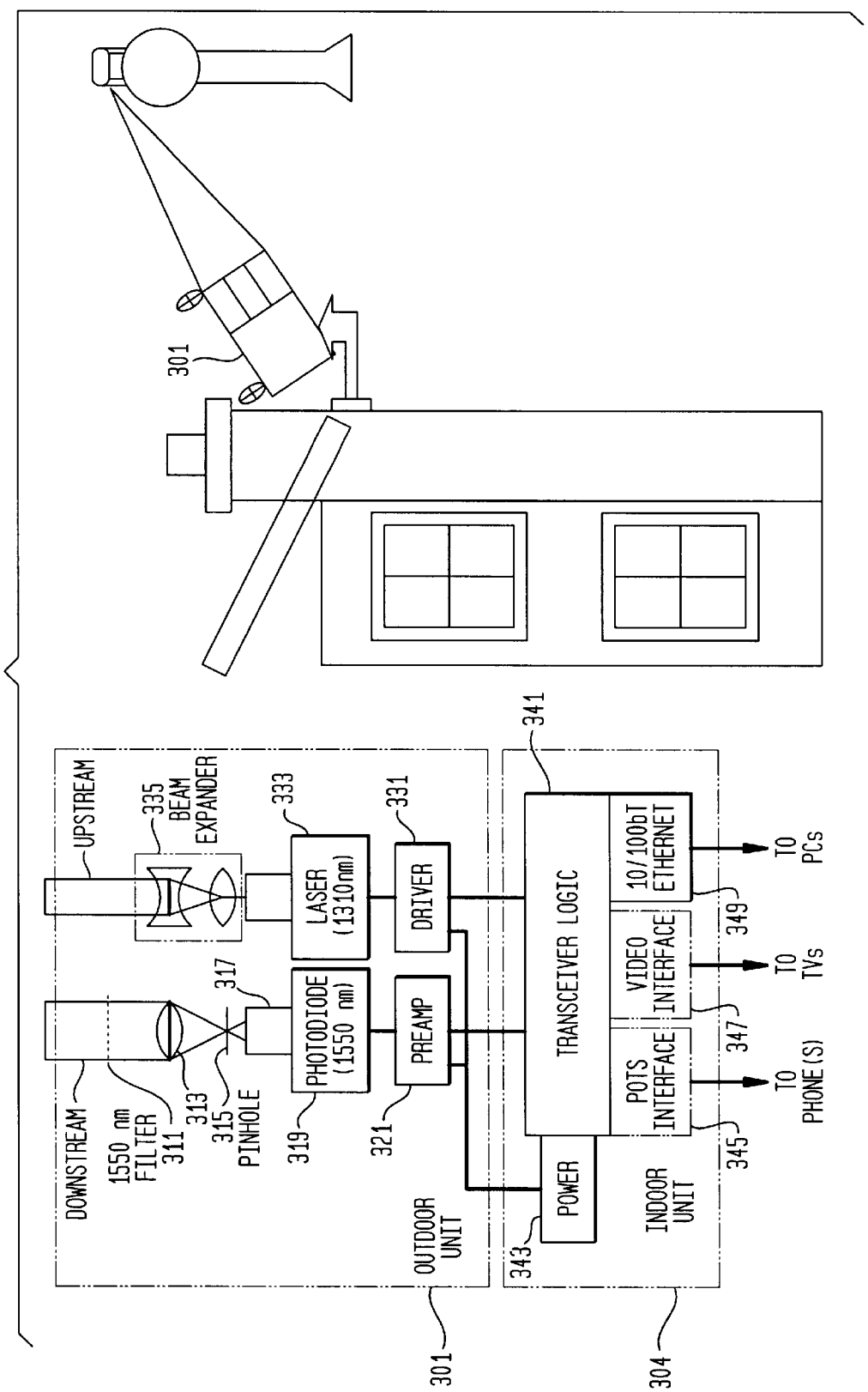
Figure 4:
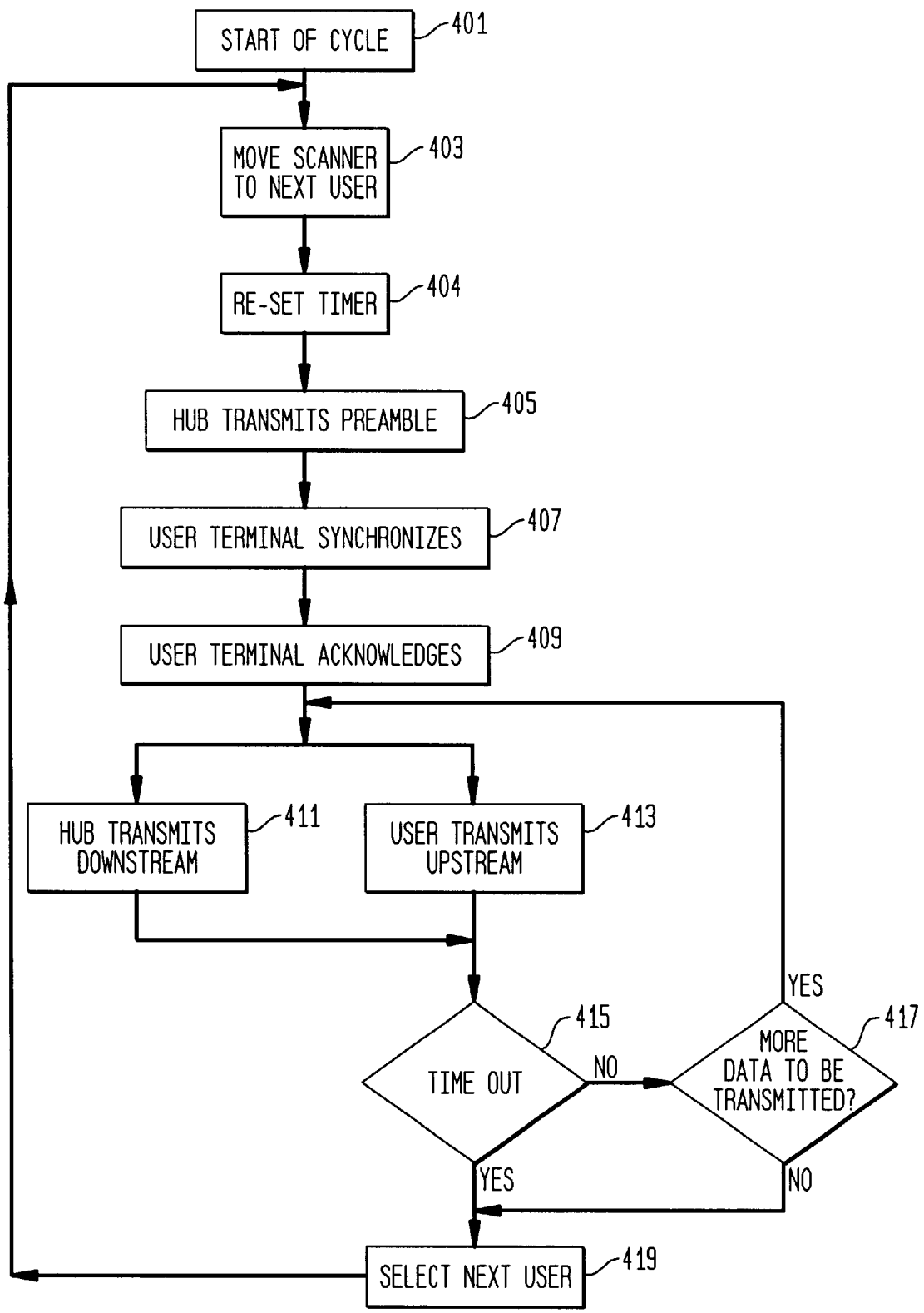

FIG. 1 is a system diagram, illustrating the relationship between the hub, the tower, and the subscribers;

FIG. 2, comprised of FIG. 2A and FIG. 2B, is a block diagram, illustrating the technical details of the central hub;

FIG. 3 is a block diagram, illustrating the technical details of the subscriber station; and FIG. 4 is a flow diagram, illustrating the control of an OLST.

DETAILED DESCRIPTION

Subscribers are demanding, and willing to pay for fast Internet access. The deployment of broadband (>1 Mbps) access systems is slower than we would like. New services, (like telecommuting, and web video), require 2–20 Mbps. New Internet/Intranet backbones have adequate capacity; access is the bottleneck. Current generation personal computers, (PCs) can process Internet access data at 10–100 Mbps.

Existing broadband access technologies have limitations. Cable modem deployment is slow, mostly due to problems updating unidirectional plants. DSL deployment is slow due to loop qualification, CPE availability, and regulation. SDV, (switched digital video) appears to be stillborn. FTTX, (Fiber to the business, curb, home, serving area, etc.), has high construction costs.

Broadband wireless, LMDS, (Local Multi-point Distribution Systems), and MMDS, (Multi-point Multi-gigabit Distribution Systems) shows promise, but has some problems: FCC spectral licenses are required for every installation; international licenses may not be available at all; tower construction often causes public backlash; line of sight is usually required; rain fading limits range to approximately 1.5 mi., for 0.99999 service reliability; point-to-point systems are about twice as expensive to install as point-to-multi-point; point-to-multi-point systems have capacity, reliability, and privacy concerns.

What is needed, therefore, is a broadband access network with most of the advantages of broadband wireless, (fast installation, scalable capacity, nearly universal access, etc.), without the disadvantages, (spectral licenses, shared media limits on capacity, reliability, and privacy).

A free space optical system solves many of these problems. Its topology is identical to point-to-multi-point microwave radio delivered LMDS service, with a central hub, (perhaps with many sectors), and an "antenna" like element mounted at each subscriber. Instead of microwave radio, this system uses free space optical links and LASERs. Optical beam scanning techniques are used at the hub to rapidly move the beam from one user to the next, creating an arbitrary number of virtual point-to-point links. Two different wavelengths of infra-red light are used for the upstream and downstream directions. In the preferred embodiment, infra-red 1310 nanometers is used for the upstream direction, 1550 nanometers for the downstream direction. Each hub can have up to eight sectors (with overlap). Each sector has a bitrate of 155 or 622 Mbps, in each direction. Each hub has a radius of about 2 mi., (about 3 KM), serving a maximum of about 10,000 homes passed. Assuming reasonable service reception rates, and duty cycles, each active residential subscriber has an average, sustainable, bi-directional data rate of 5 Mbps, and a peak rate of up to 100 Mbps. For business installations, average rates of up to 45 Mbps, with peaks of 622 Mbps are available. Typical latency is <100 ms, (about 10 ms best case, about 300 ms absolute worst case). The system is capable of 0.99999 reliability. From the user's perspective, the system looks like a large switched Ethernet hub, using IP protocol, an edge router, and an OC-3 or OC-12 link to the backbone. Installation time is typically about 1 hour per subscriber, (similar to a DBS, (Direct Broadcast Satellite), satellite dish).

The installation procedure is quite simple. Installing and aligning the Free Space Optical Broadband Access Network involves two sequences of steps.

First, select a site for the central hub, high on a rigid building or tower, with unobstructed views of the subscriber community of interest. Install the central hub, providing reliable power, lightning protection, and backbone feeder links.

To install a subscriber terminal, a field representative surveys the location to determine where to mount the terminal, and which central hub and sector to use. A laptop with differential GPS, (Global Positioning System), provides the geographic location over a wireless modem to the central Operation, Administration, Maintenance and Provisioning, (OAM&P) Bureau. The subscriber terminal outdoor unit is securely mounted, and is "bore-sighted" on the hub. Typically, the subscriber terminal's alignment with the hub has a tolerance of about 1 degree. Thereafter, cable is run, and the indoor unit is installed. Application software is started on the subscriber's PC. The installer calls an OAM&P Bureau to identify the optimum central hub for this subscriber. The installer then commands the central hub to calculate the subscriber's position, the correct scan angles to direct the beam, and adds the new subscriber to the scan list. The hub moves the beam to the rough location of the subscriber's terminal, and begins a fine tuning process to locate the optimum scan angle, which it stores. Bit error rate tests are run on both link directions, and the subscriber terminal alignment is fine tuned if necessary. Internet addresses are updated, billing is started, and the installation is complete.

To improve the reliability of the system, a second central hub can be placed on top of the first such hub. For an eight sector system, the second central hub can be offset from the first, by 22.5 degrees to provide the best redundancy. The second hub can increase the capacity of the system when both hubs are working, or can provide a half capacity system when the first hub fails. In addition, if one sector of the first hub fails, two segments of the second hub can take over, because of the 22.5 degree offset.

In addition, another hub at the top of the tower can be used for tower-to-tower communications, thus eliminating the need for fiber optic connections to the tower; the towers, thus interconnected, form a network, and traffic can be alternately routed to a tower if there is a failure in the tower from which it normally receives traffic. Eventually, after making the required number of hops between hubs, the traffic is passed to a hub that is at a location equipped with a direct connection to a high speed data backbone.

In summary, the Free Space Optical Broadband Network provides a unique alternative to other broadband access architectures. It has many of the same time to service, and cost advantages of microwave wireless networks, without the same disadvantages relating to spectral licensing, and shared media effects. Services include web access, work at home, VPN, video on demand, and telephony. It has throughput exceeding most types of DSL in the residential mode, and DS3 capacity in the business model. There are several graceful growth scenarios to permit "pay as you grow" deployments. It is simple to add redundant equipment that will support 0.99999 availability. Cost per subscriber is similar to LMDS, (excluding the substantial cost of purchase RF spectral licenses), and less than DSL, HFC, SDB, or FTTX. The system has simple installation procedures, (can even be installed by reasonable handy end users).

All of this is shown in the attached diagrams.

FIG. 1 is a block diagram, illustrating a Free Space Broadband Optical Access System, (FSBOAS). A Tower 1, such as an existing water tower, is used to mount a Central Hub 300, sufficiently high so that the hub is within line of sight of a large number of potential subscribers. The hub has a plurality of sectors for serving different groups of these subscribers. Subscriber stations 21, 22, . . . ,25, are in Sector A, and are normally served by the OLST of Sector A of the central hub. Subscriber stations 43, . . . ,44, are normally served by the OLST of Sector B of the central hub.

FIG. 2 is a block diagram, illustrating the architectural details of the central hub. The Central Hub 2, has eight sector units: 201, 202, 203, 204, 205, 206, 207, and 208. All of these units are under the control of Control/Router logic 210. The Control/Router Logic is connected to a backbone network for connecting the communications signals being exchanged with the subscribers to a network for distributing such signals. In alternate configurations, it is also possible for the Control/Router Logic to control intra-hub traffic. The details of one of the Sectors, 201, are also shown. This sector has its own Sector Logic 211, operating under the control of the Control/Router Logic for controlling the operations of Sector 201. Hub logic unit 210 performs protocol checks and conversions, control functions, and OAM&P (Operation, Administration, Maintenance and Provisioning); sector logic 211 performs mirror control, LASER power control, and bit error rate calculations. Maintenance control can be supplied locally within each sector logic unit 211, or from the hub logic unit 210, or both.

Signals from the backbone network are routed to LASER 212 to modulate the output of this LASER. In Applicants' preferred embodiment, the downstream wavelength, i.e., the wavelength of optical signals being sent to the subscriber, is 1550 nanometers. The output of LASER 212 is expanded by Beam Expander 213, to decrease the divergence of the beam that is received by the subscriber, to reduce interference from precipitation blocking a signal, and to reduce optical power density to improve eye safety. The output of the beam expander goes through a Beam Splitter 214, which allows the transmitted, (downstream) beam to pass, and which also aims the upstream beam at Photo Diode 220. The Beam Splitter 214 also acts as a filter and selects a narrow wavelength band centered on the upstream wavelength. This improves signal to noise ratio, and helps prevent damage to the photo diode from occasional direct sunlight.

The system for aiming the downstream beam is the same as the system for selecting the upstream beam, since both traverse the same line of sight path. The output Beam Splitter 214 is aimed at a Mirror 216, controlled to give deflections by a first galvonometer 115. The output of Mirror 216 is aimed at Mirror 218, which is controlled by second galvonometer 217, which provides orthogonal deflections. The output of Mirror 218, is then a downstream beam aimed at the subscriber with which the sector is currently communicating. The upstream beam, (which for clarity is shown as a very narrow beam, although in practice, it is much wider), is received at Mirror 218 as a result of the aiming of the subscriber output beam, (the upstream beam), performed during the installation. Mirror 218 is oversized and very close to Mirror 216, so that the beam is always on Mirror 218. The upstream beam is reflected by Mirror 218, and Mirror 216, and arrives at Beam Splitter 214; there, the upstream beam is deflected to Lens System 219, which aims the beam at Photo Diode 220. The upstream beam in Applicants' preferred embodiment, has a wavelength of 1310 nanometers, providing excellent separation from the signals of the downstream beam. The output of the Photo Diode 220 is then sent via the Sector Logic to the Control/Router Logic to be sent to the backbone network. For situations in which the tower is frequently or always substantially in wind, a servomechanism can be used to maintain alignment. Two types of disturbances can influence the aiming accuracy. One is wind sway at the tower. An acceleration sensor can be incorporated in the Hub Control Logic 210 to compensate the beam angle. The other disturbance is tower deflection caused by uneven solar heating. Each sector has a temperature sensor 230. The outputs of these sensors are used by the Hub Control Logic 210 to estimate the tower's deflection from true vertical and correct scan angles.

A pair of hubs can be stacked, one on top of each other, offset by 22.5 degrees. Each hub can normally serve half of the subscribers. If there is a failure in one of the hubs, then the other hub serves all of the subscribers at reduced capacity. However, even at reduced capacity, there is an excellent chance that all communications can still be handled. By offsetting the hubs by 22.5 degrees, added protection can be provided in case of a failure of one of the sectors, since two sectors from the other hub can take over the traffic from that one sector, (in addition to the traffic that they are already handling). The hubs can be connected to a backbone network by a fiber optic link, or by a free space LASER link mounted as a separate hub, or as part of one of the traffic hubs, on the tower. Signals are then distributed through an interconnected mesh of towers to the backbone network. In case one of the towers fail, those signals which it transmits to other towers can be re-routed via other towers of the mesh network.

It is important that the tower either have high stability, or that movement is detected and compensated for. Movement can be detected either by sensing acceleration as the tower moves in the wind, or by using feedback techniques that measure the bit error rate of the various links. When such movement is detected, compensating effects are added to the deflection angles. It is desirable that the customer (downstream), units measure bit error rates, and report these error rates upstream. A high detected error rate by the downstream unit is an indication that the angle of transmission from the hub may have to be altered, at least temporarily. Different angles can be tried to find the lowest error rate; the results can be interpolated, or extrapolated for other destinations. Also, Photo Diode 220 can be replaced with a quadrant photo detector. This is an assembly of five photo diodes; one in the center, and four arranged symmetrically about its periphery. If the signal detected on a peripheral photo diode rises, a beam correction signal is sent to the sector logic 211 which corrects the scan angles to re-center the beam.

FIG. 3 illustrates the architectural details of the subscriber station. Unit 301 is the outdoor part of the subscriber station. The upstream signal which is transmitted at a wavelength of 1550 nanometers, is first passed through a filter 311, then a lens 313, which focuses on a pinhole 315, which concentrates the energy of the signal onto a photo diode, units 317. Filter 311 only passes the 1550 nanometer signals from the hub, thus increasing the signal to noise ratio, and preventing a melting of the photo diode during the few minutes on the two days per year when the sun is directly behind the hub. The output of the photo diode is fed to a pre-amplifier which feeds the transceiver logic 341. The unit is powered by power unit 343, which includes an optional back-up battery, (not shown). Transceiver logic is connected to a telephone interface, POTS, (Plain Old Telephone Service), interface 345, which is connected to telephones; to a video interface 347, which is connected to television sets; and to a 10/100 Megabit (twisted pair) Ethernet unit for driving one or more personal computers (PCs). In the other direction, the transceiver logic is connected to a driver 331, which modulates a LASER 333, operating with a 1310 nanometer wavelength, and whose output feeds a beam expander 335 for transmitting the output beam back to the tower. The beam expander reduces divergence degradation caused by precipitation, and improves eye safety.

FIG. 4 illustrates the process of controlling a sector of the hub. A cycle starts, (Action Block 401). This is an overall cycle limited to 20 milliseconds in order to limit the latency of data. A scanner is moved to the next user, which initially would be the first user, (Action Block 403). A timer is reset, (Action Block 404), and starts timing. The hub then transmits a preamble 405. In response to the receipt of the preamble, the user terminal is synchronized, (Action Block 407), and the user terminal acknowledges the receipt of the preamble, (Action Block 409). Then, in parallel, the hub transmits downstream data, (Action Block 411), and the user transmits upstream data, (Action Block 413). Periodically, the timer is checked to see if there is time-out, (Test 415). If not, Test 417 is used to determine whether more data is available, (data queue not empty), to be transmitted in the upstream and/or downstream direction, (Test 417). If no more data is available, (data queue empty), to be transmitted, then Action Block 419 is entered and the next user is selected. This causes a re-entry to Action Block 403. If more data is to be transmitted, then this data is transmitted until the next time Test 415 is applied. If the result of Test 415 indicates that the timer has timed out, then Action Block 419 is entered, and Action Block 403 is re-entered.

In addition, the hub periodically checks inactive terminals to determine whether any of the inactive terminals wishes to become active. The hub sends a special preamble to an inactive terminal, and if the inactive terminal wishes to become active, it returns a special acknowledgment In response to the special acknowledgment, the now active terminal will be added to the active scan list, and visited in the next cycle. To save real time, only a portion of the idle terminals are interrogated in each cycle; as long as each idle terminal is interrogated at least once per second, the service time remains adequate.

The above description is of one embodiment of Applicant's invention. Many other embodiments will be apparent to those of ordinary skill in the art without departing from the scope of the invention. The invention is only limited by the attached claims.

We claim:

1. In a free space optical broadband access system apparatus for communicating between a source and a plurality of destinations, comprising:

means for steering a LASER beam at the source to each of said plurality of destinations;

means, coupled to said means for steering, for receiving a modulated LASER beam from each of said plurality of destinations;

means for receiving communication signals from, and transmitting communication signals to a communication network;

means, coupled to said means for steering, and said means for receiving communication signals from said communication network for modulating the steered LASER beam with the signals received from the network, toward each of said plurality of destinations; and means, coupled to said means for transmitting communication signals to said network for demodulating the received LASER beam, thereby transmitting the received signals to the network;

wherein said means for steering comprises:

means for steering said transmitted modulated LASER beam to each active one of said plurality of destinations during a cycle;

wherein said cycle is limited to an acceptable upper limit of latency for data being exchanged between said apparatus for communicating, and each of said plurality of active destinations.

2. The apparatus of claim 1, further comprising apparatus in each of said plurality of destinations, said destination apparatus comprising:

LASER beam means, aimed at said apparatus for communicating with a plurality of destinations; and receiving means, aimed to receive a LASER beam from said apparatus for communicating with a plurality of destinations;

means, for modulating said transmitted LASER beam with data from said destination; and means, for demodulating said received LASER beam for transmitting data to said one destination.

3. The free space optical broadband access system of claim 1, wherein a plurality of the apparatus for communicating with a plurality of destinations are mounted on one tower, and each of said plurality of apparatus serves destinations within a sector of the area over which apparatus mounted on said tower can transmit.

4. The apparatus of claim 3, wherein more than one apparatus for communicating can communicate with destinations one sector via redundant paths.

5. The apparatus of claim 1, further comprising means, coupled to said means for steering, for compensating for deflections of said source.

6. The apparatus of claim 5, wherein said means for compensating comprises means for detecting high error rates in signals received at ones of said destinations.

7. The apparatus of claim 5, wherein said means for compensating for deflections comprise a plurality of receiving photo diodes, and means for measuring signal strength error rate on ones of said plurality of diodes for altering an angle of said LASER beam.

8. The apparatus of claim 5, wherein said means for compensating comprises means for detecting rapid changes in deflection of a tower for mounting said LASER beam.

9. The apparatus of claim 8, wherein said rapid deflections are caused by wind and sensed by acceleration gauging.

10. The apparatus of claim 5, wherein said means for compensating comprises means for detecting slow changes in deflection of a tower for mounting said LASER beam.

11. The apparatus of claim 10, wherein said slow deflections are caused by unequal heating of said tower and sensed by temperature sensors on all sides.

12. The apparatus of claim 1, further comprising an inter-source backbone/network for communicating among said means for receiving communication signals from, and transmitting communication signals to a communication network.

13. The free space optical broadband access system of claim 1 further comprising:
a plurality of destination units for receiving signals from said LASER beam of said source, and transmitting a modulated LASER beam to said means for receiving a modulated LASER beam.

14. The destination unit of claim 8, comprising an indoor segment for interfacing with customer premises equipment, and an outdoor segment for communicating with said apparatus for communicating between a source and a plurality of destinations.

15. The destination unit of claim 8, further comprising means for measuring error rates of received signals, and for communicating error rate information to said apparatus for communicating between a source and a plurality of destinations.

16. The apparatus of claim 8, further comprising optical filters to improve signal to noise ratio.

17. The apparatus of claim 8, further comprising filters to protect equipment from being destroyed by focused sunlight.

18. The apparatus of claim 8, wherein a wavelength of the LASER beam used for transmitting signals to a destination unit is different from a wavelength used for transmitting signals from a destination unit.

19. The apparatus of claim 1, further coming optical filters to improve signals to noise ratio.

20. The apparatus of claim 1, further comprising filters to protect equipment from being destroyed by focused sunlight.

21. The apparatus of claim 3, wherein each of the plurality of apparatus serving destinations within a sector can also serve destinations at fringes of adjacent sectors thereby providing means for balancing the load between units serving adjacent sectors.

22. The apparatus of claim 3, further comprising a second set of apparatus for covering all sectors of the area.

23. The apparatus of claim 22, wherein the sectors assigned to the second set are angularly displaced from the sectors for the first set of apparatus.

24. The apparatus of claim 23, wherein each sector covers a basic angle of 45 degrees, and wherein the second set of sectors are displaced by 22.5 degrees from the sectors for the first set.

25. The apparatus of claim 1, wherein data is simultaneously exchanged in both an upstream and downstream direction, and wherein the wavelength for upstream and downstream transmission is different.

26. The apparatus of claim 25, wherein each of the destinations that is active is served at least once in every pre-determined short period, and that inactive destinations are served at a slower rate under heavy load.

27. The apparatus of claim 1, wherein each of said destinations have battery backup for power; wherein reliable power is provided for telephone users served by said apparatus.

28. The apparatus of claim 1, further comprising beam expanders to improve divergence and immunity to weather conditions, and to improve eye safety.

29. The apparatus of claim 1, wherein an upper limit of time is set for each active user destination for each cycle, and wherein, if no data is available to be transmitted from or to a particular active user destination prior to having reached said upper limit of time, transmission from and to a next active user destination is started.

30. The apparatus of claim 1, wherein each idle user destination is tested at least once per user activity cycle to see if said idle user destination has become active.

31. The apparatus of claim 30, wherein said user activity cycle is longer than said cycle for steering said transmitted modulated LASER beam.

32. The apparatus of claim 1, wherein during installation, an approximate deflection angle is calculated for the source by determining a user's location using a GPS, (Global Positioning System), and calculating an angle from said user's location and the source location.

33. In a free space optical broadband access system, apparatus for communicating between a source and a plurality of destinations, comprising:
means, for steering a LASER beam at the source to each of said plurality of destinations;
means, coupled to said means for steering, for receiving a modulated LASER beam from each of said plurality of destinations;
means for receiving communication signals from, and transmitting communication signals to a communication network;
means, coupled to said means for steering, and said means for receiving communication signals from said communication network for modulating the steered LASER beam with the signals received from the network, toward each of said plurality of destinations; and
means, coupled to said means for transmitting communication signal to said network for demodulating the received LASER beam, thereby transmitting the received signals to the network;
means, coupled to said means for steering, for compensating for deflections of said source;
wherein said means for compensating comprises means for detecting slow changes in deflection of a tower for mounting said LASER beam; and
wherein said slow deflections are caused by unequal heating of said tower and sensed by temperature sensors on all sides.

* * * * *